United States Patent [19]

Dormann

[11] Patent Number: 4,971,029
[45] Date of Patent: Nov. 20, 1990

[54] SOLAR HEATERS

[76] Inventor: Christoph Dormann, P.O. Box 781684, Sandton 2146, South Africa

[21] Appl. No.: 372,614

[22] Filed: Jun. 28, 1989

[30] Foreign Application Priority Data

Jun. 28, 1988 [ZA] South Africa .................. 88/4606

[51] Int. Cl.$^5$ ............................................. F24J 3/02
[52] U.S. Cl. ................................... 126/450; 126/444
[58] Field of Search ............... 126/450, 444, 432, 422

[56] References Cited

U.S. PATENT DOCUMENTS

| | | | |
|---|---|---|---|
| 4,244,352 | 1/1981 | Forter | 126/422 |
| 4,280,478 | 7/1981 | Duval et al. | 126/422 |
| 4,315,499 | 2/1982 | Shonerd | 126/445 X |
| 4,378,788 | 4/1983 | Naccache | 126/445 |
| 4,515,151 | 5/1985 | Slemmons et al. | 126/445 X |

Primary Examiner—Larry Jones
Attorney, Agent, or Firm—Cushman, Darby & Cushman

[57] ABSTRACT

A solar water heater includes a collector which has a substrate, a water chamber formed in or on the substrate and a toughened glass pane constituting the outside member of the water chamber. Bars extend across the pane to prevent it from bowing excessively due to water pressure in the chamber. An inlet valve is provided to allow water to be supplied to the chamber only when the solar energy is adequate to heat this water.

13 Claims, 2 Drawing Sheets

SOLAR HEATERS

BACKGROUND OF THE INVENTION

This invention relates to solar heaters.

SUMMARY OF THE INVENTION

According to one aspect of the invention there is provided a collector for a solar heater, the collector being of the kind comprising a frame, a water chamber carried by the frame and a glass pane constituting the outside member of the water chamber. Conveniently, the water chamber is also formed by a depression in a backing member which comprises a light weight cementitious material. This material is preferably a low-density reinforced, closed-cell cementitious material such as calcium silicate hydrate and more specifically preferably comprises such material sold under the trade name of "Neolite". The reinforcing is conveniently effected by glass fibre reinforcing in the material.

The material is preferably pigmented, preferably homogeneously, with a black pigment.

Alternatively, the water chamber may be constituted by a base plate carrying a surround that, in turn, carries the glass pane. The base plate may be covered with a flexible, water impervious member or sheet.

BRIEF DESCRIPTION OF THE DRAWINGS

Embodiments of the invention will now be described with reference to the accompanying drawings.

In the drawings

DETAILED DESCRIPTION

Figure 1:
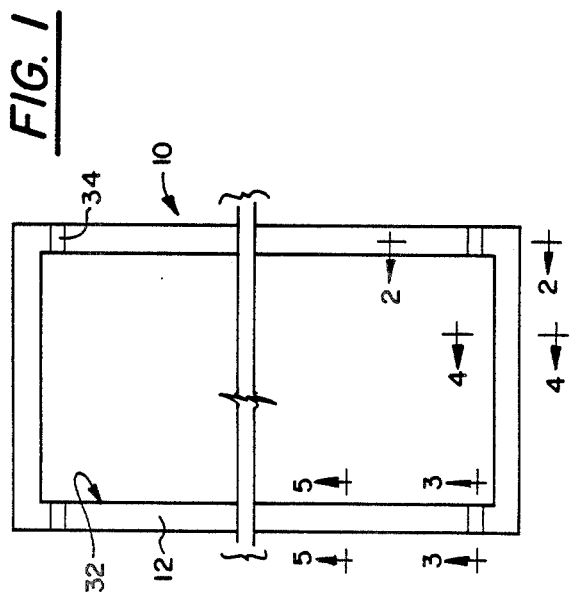
FIG. 1 is a plan view of a collector for a solar heater, embodying principles of the present invention.
Figure 2:
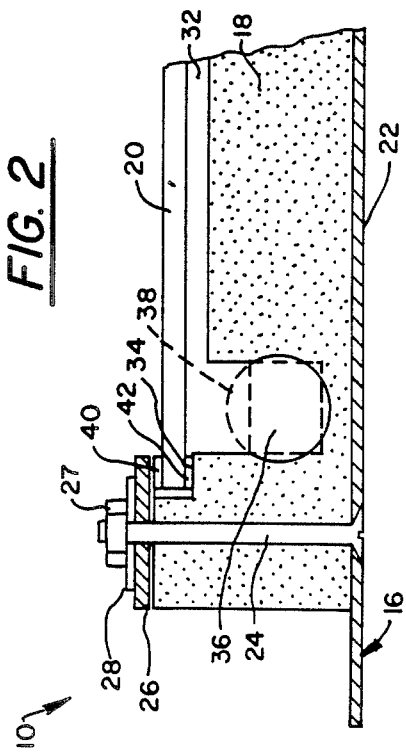
FIGS. 2, 3, 4 and 5 are enlarged scale, fragmentary cross-sectional views; respectively on lines 2—2, 3—3, 4—4 and 5—5 of FIG. 1.
Figure 3:
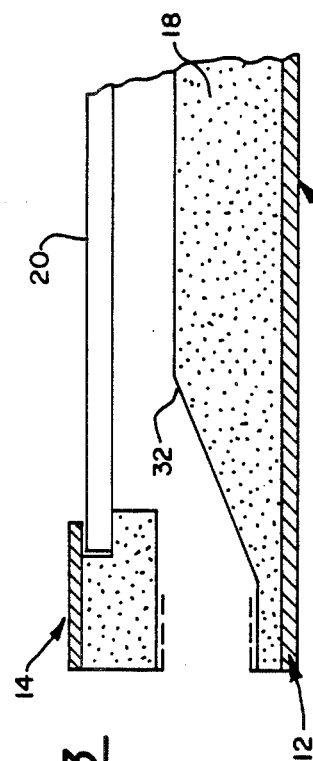
Figure 4:
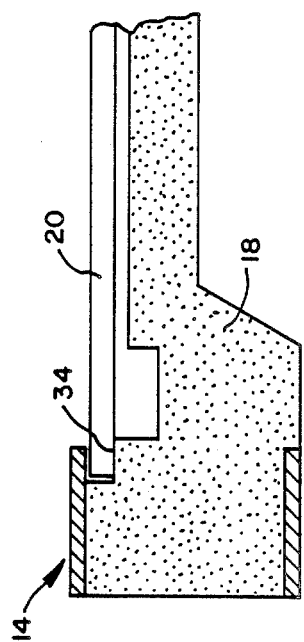
Figure 5:
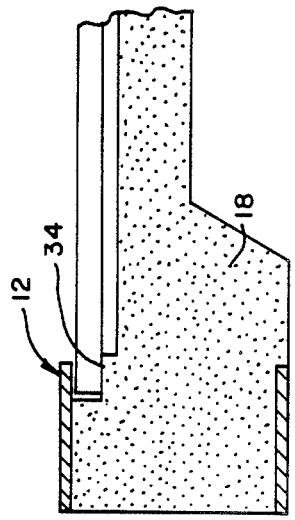

Referring now to FIG. 1, there is shown a collector 10 for a solar heater. The collector 10 comprises a frame 12 comprising upper and lower edge clamping assemblies 14 and 16, an absorber body 18 and a pane 20 of wire-reinforced cast glass.

The lower clamping assembly 16 comprises a steel base plate 22 to which are secured tie bolts 24 and which is moulded into the absorber body 18. The upper clamping assembly 14 comprises a narrow steel strip 26 having openings therein through which the upper ends of the bolts 24 pass. Nuts 27 engage the upper ends of the bolts 24 and act on the strip 26 through the intermediary of washers 28.

The absorber body 8 comprises a monolithic, low density, reinforced, closed-cell cementitious material which will be described more fully below. The body is moulded (or cast) with a main central depression 32. Near the upper and lower ends of the depression 32, there are formed transverse upper and lower header channels 34 and 36. These header channels 34 and 36 connect to outlet openings 38 that are, in turn, connected to water inlet and/or outlet pipes.

Around the depression 32 and the header channels, the body 18 is formed with a shoulder 34 on which the edge of the pane 20 rests. Sealing strips 40 and 42 are interposed between the pane 20 and the shoulders 34, on the one hand, and between the pane 20 and the strips 26, on the other hand. Thus, a water chamber is defined between the depression 32 and the pane 20, which serves both as a transmitter for the solar energy and the closure of the water chamber. Water flow through this water path can be arranged, as is well known to those skilled in the art.

The calcium silicate hydrate material of which the absorber body is comprised, is that sold under the trade name Neolite, which is homogeneously impregnated black. The material is reinforced with glass fibres. This material is water impermiable. It is extremely light and strong, so as to form a self-supporting structural unit. The material has excellent thermal insulating properties and also withstands thermal shock, and, due to its cellular structure, keeps expansion and contraction in relation to other collector components to within acceptable limits.

Figure 6:
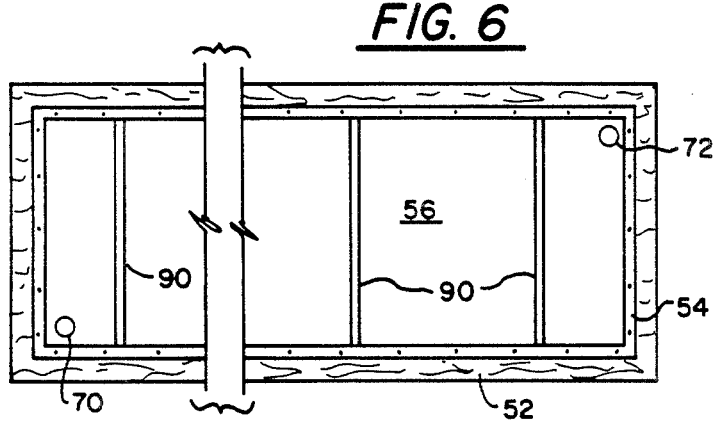
FIG. 6 is a plan of another embodiment of the collector of the present invention.
Figure 7:
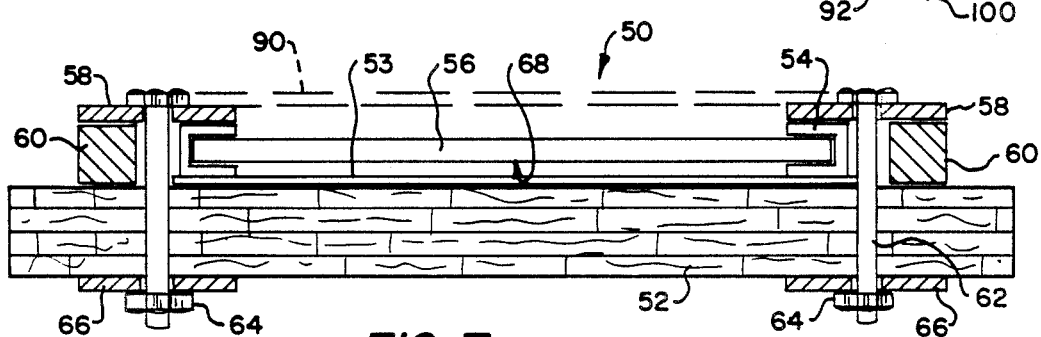
FIG. 7 is a longitudinal sectional view of the collector of FIG. 6.

Reference is now made to FIGS. 6 and 7. The collector 50 here shown comprises a base plate or substrate 52 formed, for example, of timber (but could be of any other conveniently plate material) onto which a rectangular frame 54 is carried. The entire area of the base plate 52 encompassed by, and below the frame 54 is treated with a black pigmented, water impervious material (indicated generally at 53). The frame 54 comprises rubber or Neoprene channel shaped extrusions (best shown in FIG. 7) between the arms of which is received a toughened glass pane 56. The frame 54 is clamped in position by steel plates 58, the outsides of which bear on a counter plate 60. Securing bolts 62 pass through the plates 58 and the substrate 52 where they receive holding nuts 64 that act on the underside of the substrate 52 through the intermediary of spreader plates 66.

The frame 54, the coated substrate 52 and pane 56 form a sealed water chamber 68 through which the water passes, as will be described, to be heated by solar energy. The depth of the chamber 68 is about four millimetres when no water is in the chamber 68. When the chamber has water passing therethrough, the pane will bow such that the maximum depth of the chamber 68 will be about ten millimetres.

The collector 50 further comprises a water inlet pipe 70 to, and an outlet pipe 72 from the water chamber 68.

Figure 8:
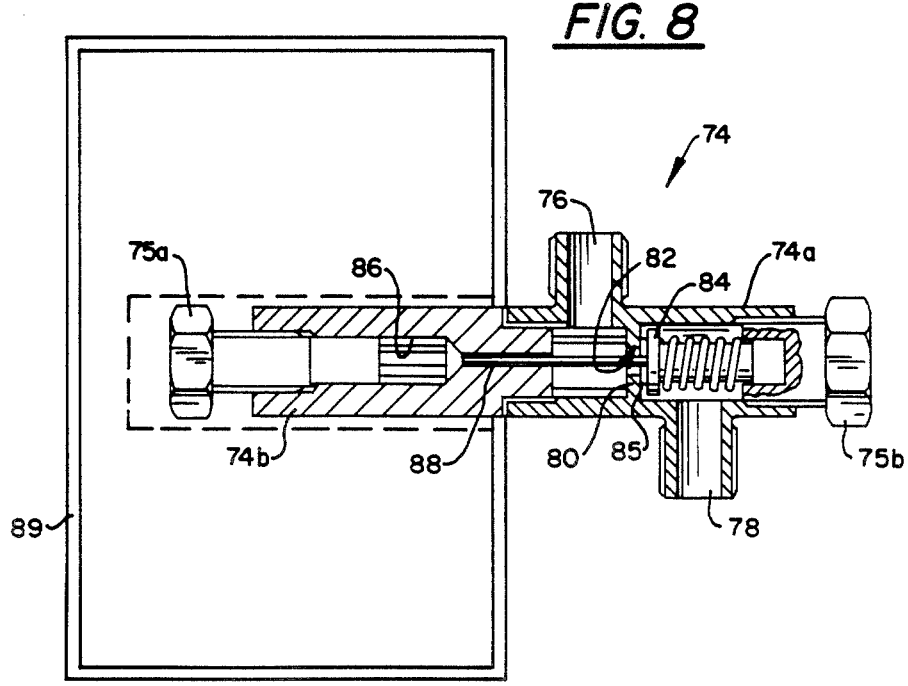
FIG. 8 is a longitudinal sectional view of a control valve for the collector in its own sub-collector.

In the inlet pipe 70, there is a control valve 74 which is subject to the same solar energy as the collector (as will be described below). The control valve 74 (which is shown in FIG. 8) comprises a two part housing. In one housing part 74a there is a pair of ports 76 and 78 separated by a valve plate 80, through which is provided a valve port 82. A spring urged valve 84 has a part 85 that seats on the valve plate 80 to obturate the valve port 82. The other housing part 74b has a chamber 86 containing wax or similar material that acts on one end of a plunger 88, the other end of which acts on the valve 84. This housing part 74b is contained within a sub-collector 89 which is similar to, but smaller than the main collector 50, and is mounted parallel and close to the main collector 50. Water is contained within the sub-collector 89 so as to be subject to the same solar energy as the water in the main collector 50. Thus, when there is substantial solar energy, the water in the sub-collector 89 will be heated and the wax will expand and, through the plunger 88, will lift the valve 84 off its seating, permitting water to enter and pass through the collector. Conversely, when there is no or little solar energy, e.g. at night or when there is excessive cloud cover, the wax will contract and the valve 84 will seat on the valve plate to obturate the port 82 and, hence, prevent water movement through the collector.

Adjusting nuts 75a and 75b are provided to enable the setting of the inlet valve 74 to be adjusted as desired.

Because the glass pane 64 may be subject to considerable stresses from within the water chamber of which it forms the outer face, transverse support bars 90 may be provided to prevent the pane 64 from bowing outwardly to too great an extent.

Figure 9:
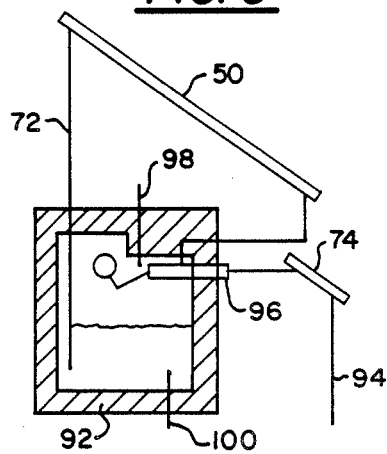
FIG. 9 shows a solar heater arrangement embodying principles of the invention.

The solar heater of the invention is mounted as shown in FIG. 9. As shown, there is an insulated storage tank 92. A source 94 of water under pressure is connected to the inlet valve 74 through which the water passes, thence through a float controlled valve 96, and then to the collector 50. After having been heated in the collector 50, the water is conveyed through the outlet pipe 72 to the storage tank 92. An overflow and vent pipe 98 is provided from the tank 92, as well as a hot water draw off pipe 100.

It will be seen that, when there is not sufficient solar energy to heat the sub-collector 89, there will not be water flow to the collector 50. Similarly, when the level of water in the storage tank reaches a pre-determined level, then water flow to the collector 50 will be cut off.

I have found that a solar heater collector as described above is sufficiently light as to be able to be mounted onto the roof of dwelling without the latter having to be reinforced. Because the base of the water chamber is pigmented black, and (in the first embodiment, because of the good thermal insulating properties of the material), there is an excellent transfer of heat to the water in the water passage.

The collectors can be connected into any other solar water heater circuit.

The invention is not limited to the precise constructional details hereinbefore described and as illustrated in the drawings. For example, an annealled and toughened glass pane may be used. This glass can be of substantial thickness, or may be reinforced in any suitable way to accomodate any strength requirements. The transverse members, in order to prevent the pane from bowing, may be of greater (or less) numbers than mentioned above and may comprise glass bars which would also enhance the intensification of radiation to the material. The features of one embodiment may be incorporated in the other as will be appreciated by the person skilled in the art.

I claim:
1. A collector for a solar heater, comprising:
 a substrate comprising a plate means having a black-pigmented surface;
 a pane of transparent material juxtaposed with said plate in vertically spaced overlying relationship with said black-pigmented surface;
 means defining an outer perimeter wall for a water chamber thereby defined between said pane and said substrate;
 first spreader plate means bearing on said pane from externally of said water chamber, and bearing on said outer perimeter wall defining means;
 nut and bolt means bearing on opposite faces of said substrate and spreader plate means and thereby drawing said pane against said outer perimeter wall defining means and said outer perimeter wall defining means against said substrate, said nut and bolt means including bolt shanks which pass through said substrate and said spreader plate means;
 means defining a water inlet into said water chamber and a water outlet from said chamber.
2. The collector of claim 1, wherein:
 said black-pigmented surface is constituted by a homogeneously black-pigmented coating.
3. The collector of claim 1, wherein:
 said plate means of said substrate comprises a base plate made of water pervious material and coated on an upper face thereof with a water impervious material.
4. The collector of claim 3, wherein:
 said water impervious material comprises a homogeneously black-pigmented coating which provides said black-pigmented surface.
5. The collector of claim 3, wherein:
 said water pervious material comprises timber.
6. The collector of claim 3, further comprising:
 second spreader plate means bearing on said timber from externally of said water chamber and being urged against said timber by said nut and bolt means.
7. The collector of claim 6, wherein:
 said first and second spreader plate means are made of steel.
8. The collector of claim 1, further comprising:
 said pane having a perimetrically outer edge; and
 a frame made of extruded flexible material framing said outer edge and being squeezed against said pane between said spreader plate means and said substrate for perimetrically cushioning said pane and sealing said water chamber.
9. The collector of claim 8, wherein:
 said extruded flexible material is made of rubber.
10. The collector of claim 1, further comprising:
 a plurality of cross-bars overlying said pane and connected at opposite ends to perimetrically spaced sites on said spreader plate means, said cross-bars being disposed sufficiently close to said pane as to function, in use, for limiting outward bowing of said pane away from said water chamber.
11. The collector of claim 1, wherein:
 said pane is made of wire-reinforced glass.
12. The collector of claim 1, wherein:
 said pane is made of glass.
13. The collector of claim 12, further comprising:
 a plurality of cross-bars overlying said pane and connected at opposite ends to perimetrically spaced sites on said spreader plate means, said cross-bars being disposed sufficiently close to said pane as to function, in use, for limiting outward bowing of said pane away from said water chamber.

* * * * *